UNITED STATES PATENT OFFICE.

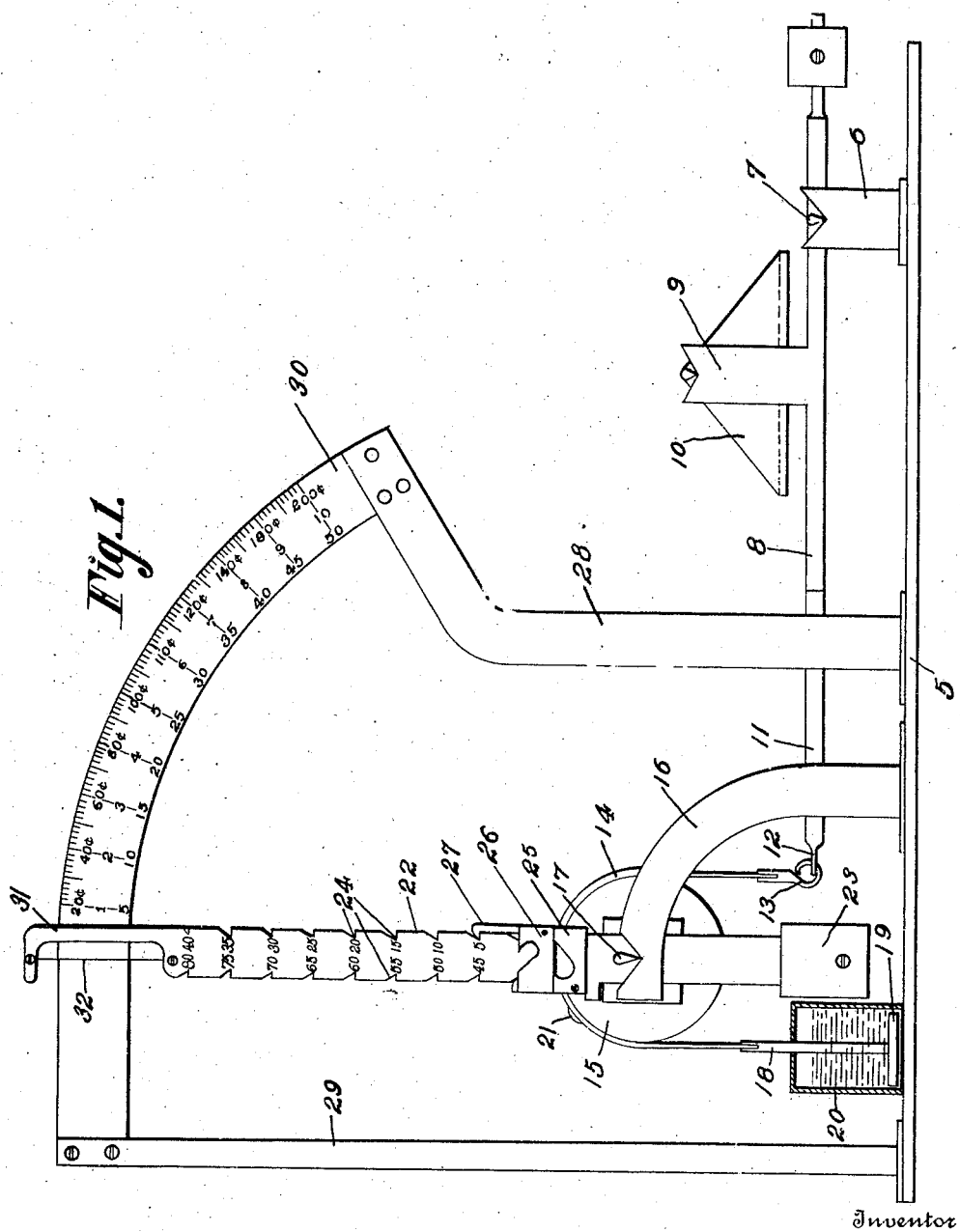

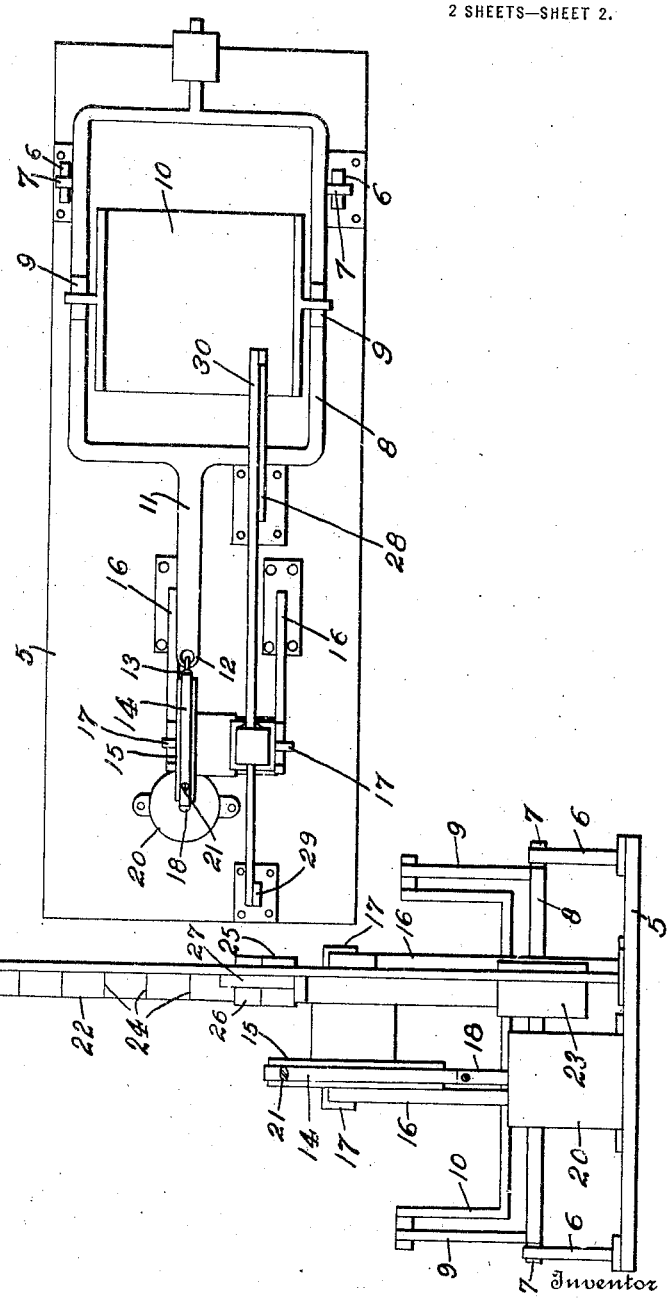

HENRY F. KINSER, OF CHATTANOOGA, TENNESSEE.

SCALE.

1,422,104.  Specification of Letters Patent.  Patented July 11, 1922.

Application filed January 18, 1921. Serial No. 438,158.

*To all whom it may concern:*

Be it known that I, HENRY F. KINSER, a citizen of the United States, residing at Chattanooga, in the county of Hamilton and State of Tennessee, have invented a new and useful Scales, of which the following is a specification.

This invention relates to scales, and more particularly to scales of the computing type, it being the primary object of the invention to provide a scale having a dial, whereby weights and pounds and fractions of pounds may be more accurately determined.

A further object of the invention is to provide scales of this character which will register the cost of a number of pounds or ounces, to the end that the value of the material being weighed may be readily determined.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a side elevational view of scales constructed in accordance with the present invention.

Figure 2 is a front elevational view of the same.

Figure 3 is a plan view of the same.

Referring to the drawings in detail, the reference numeral 5 designates the base of the scales on which is supported a bearing member 6, which has the upper portion thereof notched to provide a seat for the shaft 7 which is carried by the beam frame 8.

The beam frame 8 is provided with spaced upwardly extending bearing members 9 which support the scale pan 10, the forward portion of the beam frame 8 being formed into a beam 11 which is apertured as at 12 to accommodate the hook member 13 forming a part of the ribbon 14.

This ribbon 14 operates over the drum 15, which has pivotal connection with the curved bracket members 16, as at 17, one end of the ribbon 14 being connected to the rod 18 of the plunger 19, that operates in the cylinder 20 which is filled with a suitable fluid such as oil, to retard the movement of the plunger 19 and cause the scales to operate evenly.

As shown, the ribbon 14 has connection with the drum 15, as by means of the rivet 21 which passes through the ribbon and has a portion thereof embedded in the drum 15, so that movement of the ribbon will produce a relative movement of the drum for purposes to be hereinafter more fully described.

Pivotally supported on the bracket members 16 and rigid with the drum is an indicating beam 22, which indicating beam has its lower portion extending below the bracket members 16 and provided with a weight 23, while the upper portion of the indicating beam extends to a point remote from the bearing member 16, and as shown, the upper portion of the beam is provided with a plurality of notches 24 disposed along the opposed edges thereof, there being provided a suitable numeral opposite each notch to indicate price per pound.

A pair of weights 25 and 26 respectively are carried on the upper portion of the beam 22, the upper weight 26 being slightly heavier than the weight 25 and is used in conjunction with the numbers formed on the right hand side of the beam 22, while the weight 25 which operates under the weight 26 cooperates with the series of numbers formed on the left hand side of the beam 22 but it is to be understood that the combined weight of both weights 25 and 26, is much less than the weight of the member 23, so that when the weights 25 and 26 are moved adjacent to the bracket members 16, the center of gravity in the beam poise is near the weight 23 or at a point below the pivot 17.

Each of the weights 25 and 26 is provided with a hook member 27 designed to be positioned within the notches 24 associated therewith, whereby the weights 25 and 26 may be held in predetermined positions of adjustment throughout the length of the beam 22. Having connection with the base 5 are the upwardly extending arms 28 and 29, which arms have their upper ends spaced apart and support the dial 30 which is curved as clearly indicated by Figure 1 of the drawings, and provided with a plurality of numerals indicating price, and weight.

The upper portion of the beam 22 is formed into a pair of spaced arms 31 between which arms is stretched a wire 32 adapted to move over the numerals on the dial 30 to register therewith.

In the operation of the device, assuming that the center of gravity in this operation is as illustrated by Figure 1 of the drawings, that is to say, the weights 25 and 26 being moved to points adjacent to the bracket members 16. At 5 cents a pound, with the weights in this position, causes the center of gravity to be elevated a small fraction, at 6 cents a pound, the center of gravity is elevated slightly, and at 7 cents a pound, the center of gravity is elevated still more, and so on.

Assuming that the weight 26 is in a position opposite the numeral 10 on beam 22, the material weighing 20 lbs. is placed on the scale pan, the beam 22 will move until the wire 32 coincides with the 200 cent mark, 20 pounds at 10 cents = 200 cents.

Having thus described the invention, what is claimed as new is:—

1. In a scale, a base, a beam frame supported above the base and carrying a scale pan, bracket members supported by the base, a drum supported by the bracket members, a ribbon having connection with the beam frame and passing over the drum, an indicating beam having notches formed therein and having numerals disposed thereon opposite the notches, a pair of weights adjustable on the indicating beam and adapted to be positioned opposite the notches, to shift the center of gravity of the indicating beam, a dial cooperating with the indicating beam, said dial having a line of numbers cooperating with the respective adjustable weights.

2. In a scale, a base, a beam frame supported above the base and carrying a scale pan, curved bracket members supported by the base, a drum supported by the bracket members, means for restricting movement of the drum, means for moving the drum, an indicating beam supported by the bracket members and carrying a stationary weight on one end thereof, a plurality of movable weights on the indicating beam, said movable weights adapted to be adjusted along the indicating beam, a dial cooperating with the indicating beam, and having numerals to be used in conjunction with each adjustable weight.

3. In a scale, a base, a beam frame supported by the base and having a scale pan, mounted thereon, bracket members supported by the base, a drum supported by the bracket members, an indicating beam associated with the drum and adapted to move therewith, a stationary weight on one end of the indicating beam for normally holding the indicating beam in an upright position, means for transmitting motion to the beam frame through the drum, adjustable weights on the indicating beam for regulating the center of gravity of the indicating beam, a dial associated with the indicating beam, and having numerals to be used in conjunction with each adjustable weight.

In testimony that I claim the foregoing as my own, I have hereto affixed my signature in the presence of two witnesses.

HENRY F. KINSER.

Witnesses:
S. F. KINSER,
FRANK W. BOWSON.